United States Patent [19]

Ninomiya

[11] 4,189,756
[45] Feb. 19, 1980

[54] APPARATUS FOR GENERATING BI-PHASE CODED CHARACTERS

[75] Inventor: Ichiro Ninomiya, Atsugi, Japan

[73] Assignee: Sony Corporation, Tokyo, Japan

[21] Appl. No.: 956,449

[22] Filed: Nov. 1, 1978

[30] Foreign Application Priority Data

Nov. 5, 1977 [JP] Japan .................................. 52-132853

[51] Int. Cl.² .......................... H04N 5/78; G11B 5/06
[52] U.S. Cl. ........................................ 360/14; 360/49
[58] Field of Search .................... 360/14, 72.2, 42, 43, 360/49

[56] References Cited

U.S. PATENT DOCUMENTS 3,739,086   6/1973   Heather .................................. 360/42

Primary Examiner—Bernard Konick
Assistant Examiner—Alan Faber
Attorney, Agent, or Firm—Lewis H. Eslinger; Alvin Sinderbrand

[57] ABSTRACT

Apparatus for generating bi-phase coded characters formed of a predetermined number of bi-phase signals representing binary bits "1" and "O" having a constant relation between the phases at the beginning and end of each coded character regardless of the number of "1"s and "O"s included in the coded character. A source of binary bits supplies trains of serial bits corresponding to the coded characters, these serial bits being supplied to the bi-phase signal generator which is responsive to each bit for generating a respective bi-phase signal. A binary bit of predetermined sense is supplied in time coincidence with a selected one of the bits in each coded character; and this bit of predetermined sense is selectively inserted into the train of binary bits which is supplied to the bi-phase generator, thereby maintaining the constant relation between the phases at the beginning and end of the bi-phase coded character generated by the bi-phase signal generator. In a preferred embodiment, the coded characters are SMPTE time code characters, wherein a binary "1" bit is represented by a level transition at the beginning of the bit period and another level transition during that bit period, while the binary "O" bit is represented by a level transition only at the beginning of the bit period. The bi-phase SMPTE time code character which is generated by the apparatus of this invention has a level transition at the beginning of the character which is of the same sense, or polarity, as the level transition which is provided at the end of that character.

16 Claims, 18 Drawing Figures

FIG. 3
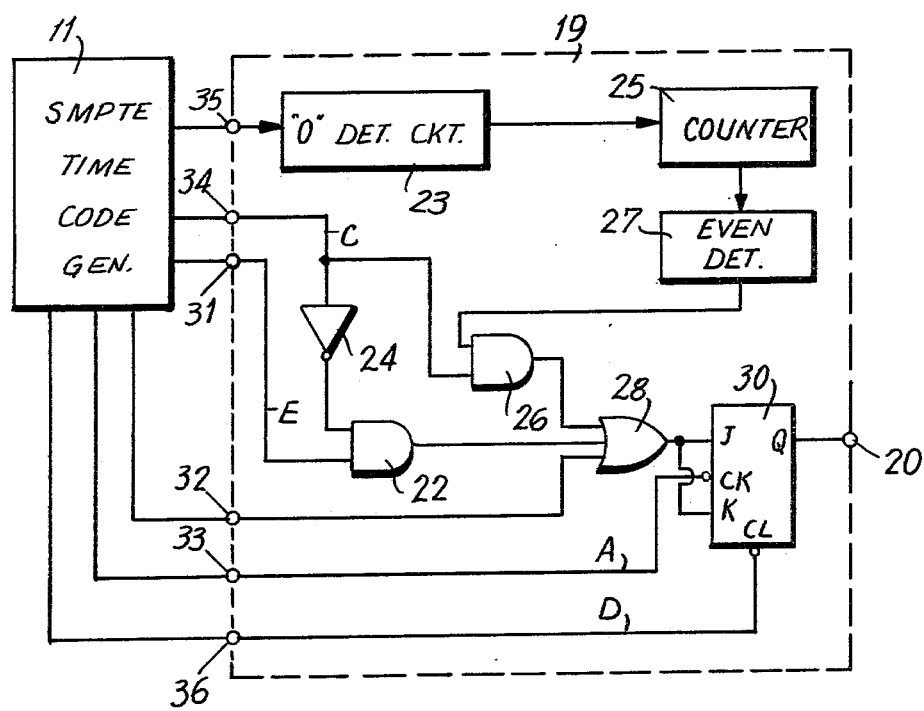
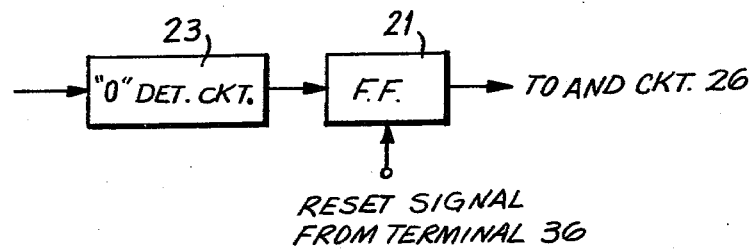
FIG. 5

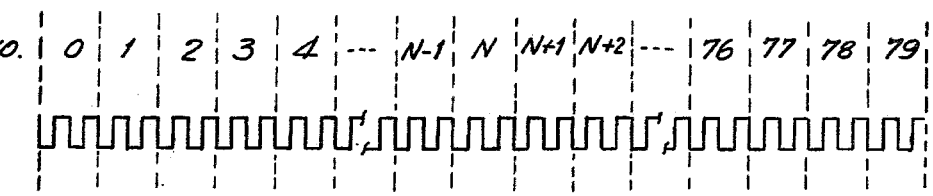
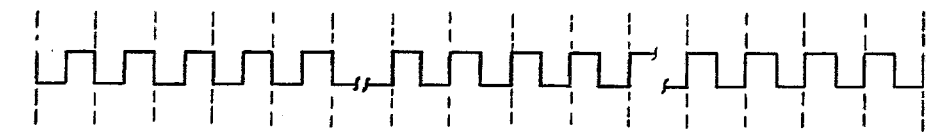
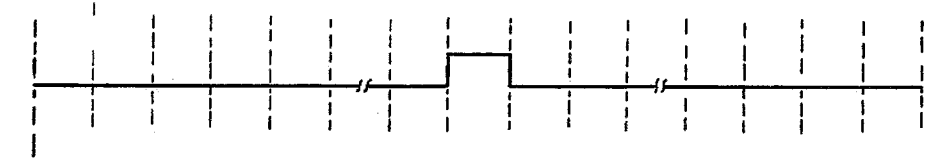
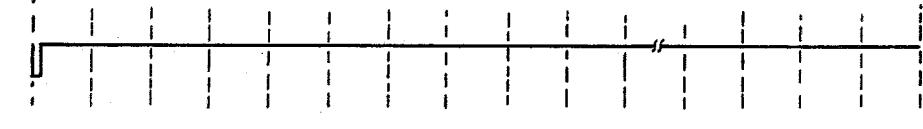
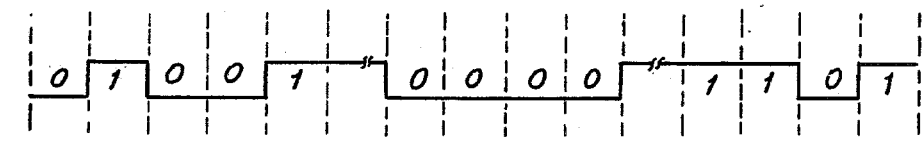
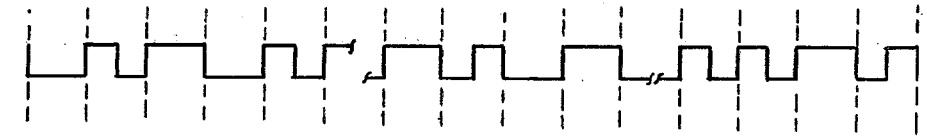
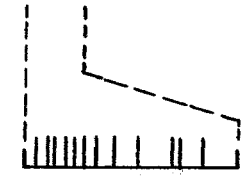

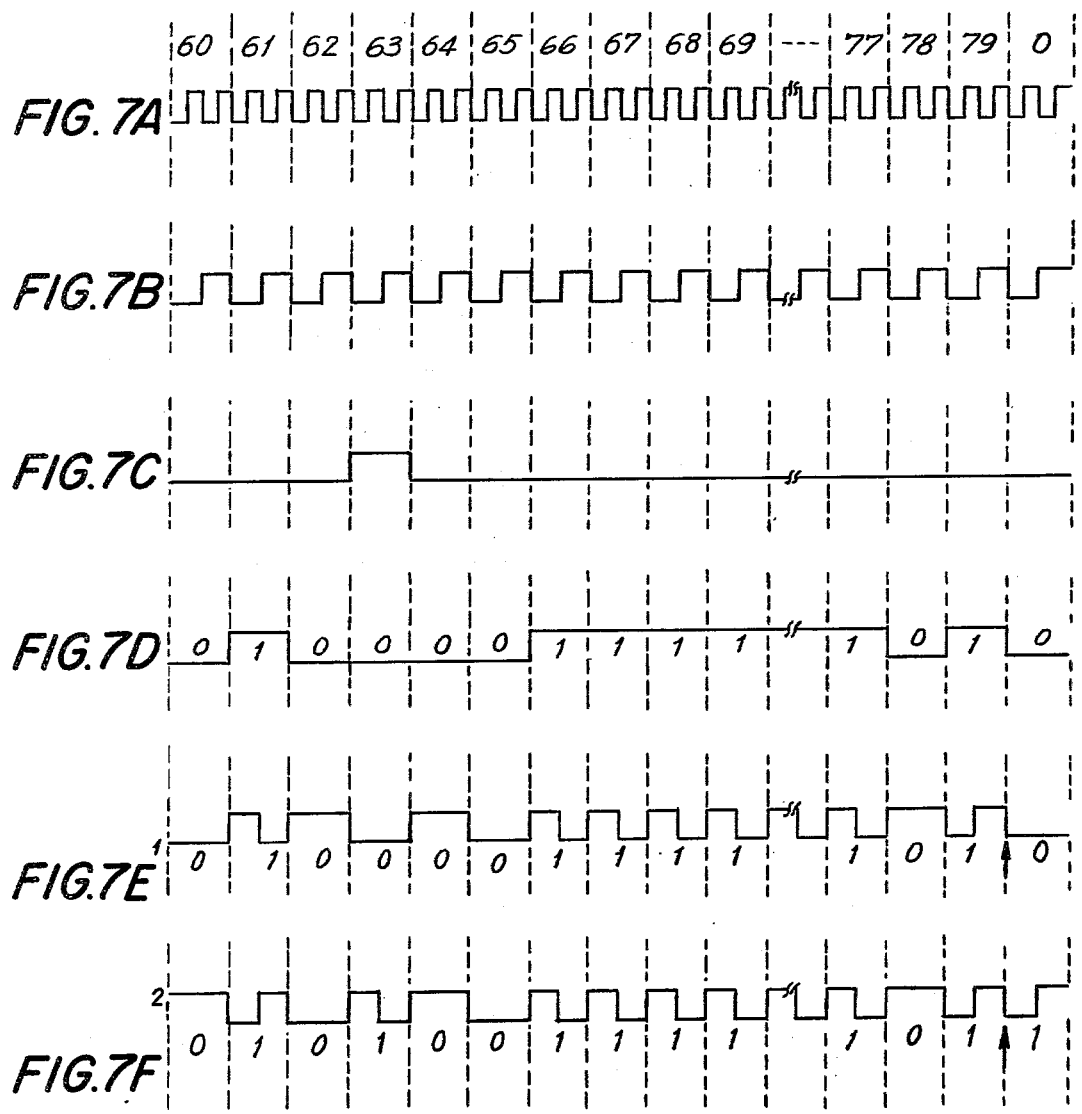

APPARATUS FOR GENERATING BI-PHASE CODED CHARACTERS

BACKGROUND OF THE INVENTION

This invention relates to apparatus for generating coded characters and, more particularly, to such apparatus wherein a bi-phase coded character is generated having a constant relation between the phases at the beginning and end of each coded character regardless of the number of "1"s and "0"s included in that character. In accordance with a specific aspect of this invention, an SMPTE time code character is generated having a level transition at the start thereof which is of the same phase, or polarity, as the level transition at the end thereof.

With the advent of video recording and playback devices, such as the video tape recorder (VTR), various situations may arise wherein a recorded medium, such as recorded video tape, should be edited such that certain information thereon is replaced by other, desired information, or that certain additional information is recorded immediately following a previously recorded segment. The former editing operation is known as an insert edit wherein, for example, one or more frames of video signals which are recorded on one video tape are replaced by an equal number of frames of video signals which had been recorded on another video tape. The latter edit operation is known as an assemble edit wherein one of more frames of video signals which had been recorded on another video tape are transferred, or re-recorded, onto the main video tape, whereby an entire program may be "assembled".

As may be appreciated, in order to carry out an insert edit or an assemble edit operation, that is, an operation wherein video signals which had been recorded on a secondary tape are transferred, or re-recorded, onto a primary tape, two separate VTR's are needed for controlling the respective playback and recording operations of the secondary and primary tapes. The secondary VTR must be operated to ascertain those frames containing the video information which must be transferred to the primary tape and the primary VTR must be controlled so as to ascertain the precise location on the primary tape at which the secondary information is to be recorded. Furthermore, both VTR's must be operated in synchronism with each other.

In order to facilitate such editing operations, and particularly, to identify the specific frames of video signals which are to be edited, a standardized code has been developed, known as the SMPTE time code. This SMPTE time code is a serial code formed of a predetermined number of binary bits which are recorded as phase-modulated, or bi-phase signals. In accordance with the present standard, the SMPTE time code contains eighty bi-phase bits which represent, in BCD format, an indication of the time at which each frame of video signals is recorded, a frame count and optional binary word information. This time code also includes a sixteen bit synchronizing word and a number of so-called binary groups which may be used either for future information or as the user of the video tape so desires. A more complete description of this SMPTE time code is described in "Standardization for Time and Control Code for Video Tape and Audio Recorders" by E. K. Dahlin, December 1970, Journal of the SMPTE, Volume 79, page 1086. Another proposal for a standardized time code for video recording is the EBU time code.

In the bi-phase representation of binary bits, the beginning of each bit period is marked by a level transition, either a positive transition from a lower to a higher level or a negative transition. A binary "1" is represented by yet another level transition during the bit period, while a binary "0" is represented by the absence of any additional bit transitions throughout the bit period. In recording the SMPTE time code on video tape, the bi-phase signals are recorded in seriatum along a longitudinal edge of the tape such that the beginning of an SMPTE character starts at the beginning of the frame of video signals and ends at the end of that frame of signals. Thus, the end of one SMPTE character is coincident with the beginning of the next following SMPTE character. Accordingly, it is important that the phase of the beginning of an SMPTE character, that is, the direction of the level transition at the start of the SMPTE character, be consistent, or compatible, with the phase at the end of the preceding SMPTE character. This means that if the preceding SMPTE character ends with a negative-going transition, the next following SMPTE character should start with a negative-going transition.

In the insert edit operation wherein video signals which has been recorded on the primary tape are replaced by video signals which are played back from the secondary tape, that is, the secondary video signals are "inserted" between two existing segments on the primary tape, the SMPTE time code characters which had been recorded for the particular segment on the primary tape which is being replaced normally remain on the primary tape. Thus, in the insert edit operation, there is no change in the recorded SMPTE characters and, therefore, there is no problem in making sure that the phase at the end of a preceding SMPTE character is compatible with the phase at the beginning of the next following SMPTE character. However, in the assemble edit operation, a new SMPTE time code is recorded together with the new video signals which are recorded from the secondary video tape. Since the new SMPTE time code characters are not recorded during the same operation that the preceding SMPTE time code characters were recorded, it is possible that the phase at the beginning of a new character may not be compatible with the phase at the end of the preceding, previously recorded character. It has been thought that this problem can be solved by, for example, reading the next-to-last SMPTE time code character which is recorded on the primary tape just prior to the assemble edit location thereon and then interpolate the information represented by the read character such that the content of the last character can be ascertained, and thus the phase at the end of that last character will be known. Once this phase is known, the new SMPTE time code characters can be generated so as to be compatible therewith. However, this assumes that the last few frames of the previously recorded video signals on the primary tape had been recorded in succession. Thus, the frame count contained in the last character will be one greater than the frame count included in the preceding character, and so on. This technique is not successful if successive frames of video signals are assembled on a frame-by-frame basis, such as for assembling an animated video picture. In that event, the content of the last-recorded SMPTE time code character will not merely be one frame greater than the SMPTE time code character which precedes it.

OBJECTS OF THE INVENTION

Therefore, it is an object of the present invention to record SMPTE time codes in a manner which overcomes the aforenoted problems heretofore present in the prior art.

Another object of this invention is to provide improved SMPTE time code generating apparatus wherein the phase at the beginning of an SMPTE time code character always is compatible with the phase at the end of a preceding SMPTE time code character, even if these two characters are not generated in succession.

A further object of this invention is to provide an improved SMPTE time code generator in which the phase relation at the beginning and end of each character remains constant regardless of the contents of that character.

In a broader aspect thereof, it is an additional object of this invention to provide apparatus for generating bi-phase coded characters having a constant phase relation, such as the same phase relation, at the beginning and end of each coded character regardless of the number of bi-phase "1"s and "0" included therein.

Yet another object of this invention is to provide improved SMPTE time code generating apparatus which generates SMPTE time code characters which are particularly useful in assemble edit operations of a video tape.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for generating bi-phase coded characters formed of a predetermined number of bi-phase signals representing binary bits "1" and "0" having a constant relation between the phases at the beginning and end of each coded character regardless of the number of "1"s and "0"s included in the coded character. The apparatus is comprised of a source of binary bits which supplies trains of serial bits corresponding to the coded characters, and a bi-phase signal generator responsive to each of the binary bits included in the trains of serial bits supplied thereto for generating a respective bi-phase signal. A binary bit of predetermined sense is supplied in time coincidence with a selected one of the bits in each coded character, and this binary bit is selectively inserted into the bit-train supplied to the bi-phase signal generator so as to maintain the constant relation between the phases at the beginning and end of each generated bi-phase coded character.

In accordance with one aspect of the present invention, the bi-phase coded character is an SMPTE time code character; and the constant phase relation is maintained by making sure that each time code character begins and ends in the same phase, that is, with a level transition in the same direction. A specific feature of this invention is to make sure that each SMPTE time code character contains an even number of binary "0" bits, whereby the level transition at the end of each character will be in the same direction as the level transition at the beginning thereof. In one embodiment, this is achieved by making the binary bit of predetermined sense a binary "1" bit, and by replacing a predetermined binary "0" bit in the SMPTE time code with this binary "1" bit in the event that it is detected that an odd number of binary "0" bits is included in the SMPTE time code character.

BRIEF DESCRIPTION OF THE DRAWINGS

The following detailed description, given by way of example, will best be understood in conjunction with the accompanying drawings in which:

FIG. 3 is a partial block, partial logic diagram of one embodiment of the present invention;

FIGS. 4A–4G are waveform diagrams which are useful in understanding the operation of the apparatus shown in FIG. 3;

FIG. 5 is a block diagram of an alternative embodiment of one portion of the apparatus shown in FIG. 3;

FIGS. 7A–7F are waveform diagrams which are useful in understanding the operation of the embodiment shown in FIG. 6.

DETAILED DESCRIPTION OF SOME OF THE PREFERRED EMBODIMENTS

Figure 1:
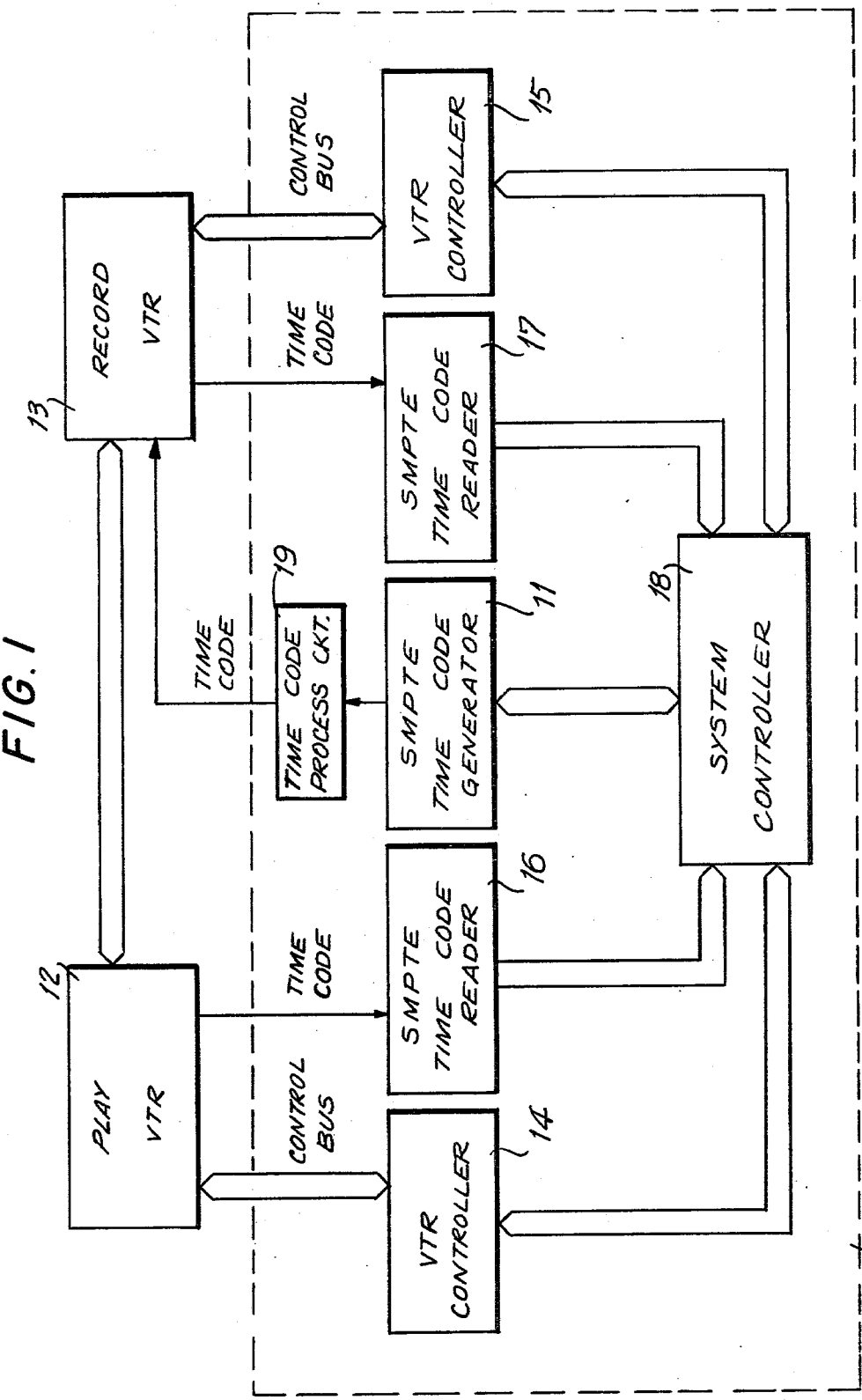
FIG. 1 is a block diagram of editing apparatus which can be be used in, for example, an assemble edit operation.

Before turning to a discussion of the present invention, reference is made to FIG. 1 which is a block diagram of apparatus which functions to carry out the assemble edit operation, which apparatus is readily adapted to incorporate this invention. The illustrated apparatus serves to transfer program information comprised of video and audio signals from a secondary recorder/reproducer, shown herein as a playback VTR 12, to a primary recorder/reproducer, shown herein as a record VTR 13. Of course, in an edit operation, secondary information can be derived from, for example, a video camera to be recorded on primary record VTR 13. In transferring information from secondary playback VTR 12 for re-recording on primary record VTR 13, the secondary information may have been recorded at any time prior to the edit operation, and may even be archival information. Also, the transferred information which is re-recorded on primary record VTR 13 may be recorded at a portion, or "slot" between existing, previously recorded information, such as in the aforementioned insert edit operation, or may be recorded on the primary tape immediately following existing, or previously recorded, information, as in the aforementioned assembly edit operation. It is recalled that in the insert edit operation, only the video (and audio) signals are re-recorded on the primary tape. The SMPTE time code characters which had been recorded previously on the primary tape in the portion, or "slot" which will be used for the recording of the inserted material will remain as is. However, in the assemble edit operation, the new, or additional information which is recorded on the primary tape will be accompanied by new SMPTE time code characters.

Secondary playback VTR 12 and primary record VTR 13 are selectively controlled by editor apparatus 10. Accordingly, the editor apparatus is coupled to secondary playback VTR 12 by a control bus to supply various control signals to the secondary VTR, such as direction and speed control signals and a playback command signal. Editor apparatus 10 is coupled to primary record VTR 13 by a control bus for supplying speed and direction control signals, as well as record and playback command signals to the primary VTR. FIG. 1 also illustrates that respective time code leads are coupled between editor apparatus 10 and each of the secondary and primary VTR's. The purpose of these time code leads is to supply SMPTE time code characters which are reproduced from the secondary and primary tapes, respectively, to the editor apparatus. As will be recognized by those of ordinary skill in the art, these reproduced time code characters enable the user of the editor apparatus to search for, and then ascertain, the locations of secondary information which had been recorded on the secondary tape such that this secondary information can be transferred to the primary tape. The SMPTE time code characters which are reproduced from the primary tape are used by the operator to locate the proper location on the primary tape at which the edit operation is to be performed.

Editor apparatus 10 includes a secondary VTR controller 14 coupled to secondary playback VTR 12 via the illustrated control bus, and a primary VTR controller 15 coupled to the primary record VTR 13 by the other illustrated control bus. VTR controllers 14 and 15 additionally are coupled, via respective buses, to a system controller 18, this system controller being of the type which determines the present positions of the secondary and primary tapes being transported by the secondary and primary VTR's, respectively, the differences between the respective present positions of the secondary and primary tapes and their desired edit locations, and which controls the respective operating conditions of the VTR's in order to carry out the edit operation. System controller 18 also functions to search the respective tapes for the proper information recorded thereon which is to be retained on the primary tape and which is to be transferred from the secondary tape. In this regard, system controller 18 may include a suitably programmed micro-processor, which micro-processor forms no part of the present invention per se.

Editor apparatus additionally includes a secondary time code reader 16 and a primary time code reader 17 coupled via respective time code leads to secondary playback VTR 12 and primary record VTR 13, respectively. Each time code reader is adapted to receive the time code characters which are reproduced from the secondary and primary tapes, respectively, during transport thereof. It is recalled that the SMPTE time code characters are recorded as serial bi-phase signals. In one embodiment, each time code reader functions to convert these bi-phase signals into conventional binary "1" and "0" bits. If desired, these binary bits may be supplied serially to system controller 18 by time code readers 16 and 17; or, alternatively, these time code readers may supply the information included in the read SMPTE time code in predetermined timed relation to the system controller. For example, the time code reader may supply the time data and frame data to the system controller, and also whatever particular data has been encoded in the various binary groups which are included in the SMPTE time code. This data is used by system controller 18 for controlling the various operations of the secondary and primary VTR's.

Editor apparatus 10 also includes an SMPTE time code generator 11, this time code generator being coupled to system controller 18. The SMPTE time code generator is adapted to generate successive SMPTE time codes in usual binary "1" and "0" bits. These time codes are supplied to system controller 18, thereby providing the system controller with information concerning future SMPTE time codes which, in an edit operation, will be recorded on the primary tape by primary record VTR 13. As shown, system controller 18 and SMPTE time code generator 11 are connected by a bi-directional data bus. This enables the system controller to control the time codes which are generated by time code generator 11. For example, depending upon a particular edit operation, certain SMPTE time code characters may be deleted, or the generation of SMPTE time codes may be advanced to a predetermined code, or particular information may be represented by various ones of the binary groups which are included in the SMPTE time code character. SMPTE time code generator 11 also is coupled to a time code processing circuit 19 via a data bus. Time code processing circuit 19 is described in greater detail hereinbelow with respect to one embodiment shown in FIG. 3 and another embodiment shown in FIG. 6. It will suffice for the present discussion to appreciate that time code processing circuit 19 is responsive to the various signals supplied thereto by SMPTE time code generator 11 for generating serial bi-phase coded SMPTE time code characters. A time code lead is coupled from the time code processing circuit to primary record VTR 13, whereby the SMPTE time code characters which are generated by the time code processing circuit are recorded on the primary tape while information also is recorded thereon.

Consistent with the embodiments of time code processing circuit 19, to be described below, SMPTE time code generator 11 supplies a clock signal thereto, this clock signal having a frequency equal to twice the maximum repetition rate (i.e., the repetition rate of the bi-phase representation of the binary "1" bits), another clock signal equal in frequency to this maximum repetition rate of the bi-phase signal, a binary representation (serial-by-bit) of the SMPTE time code character which is to be recorded in seriatum on the primary tape, an insertion bit of predetermined sense, and a high-speed version of the presently SMPTE time code character. These signals are utilized by time code processing circuit 19 to generate the bi-phase SMPTE time code which is recorded on the primary tape, as will be described.

In an assemble edit operation, editor apparatus 10 is used to control the scanning of the secondary and primary tapes in secondary and primary VTR's 12 and 13, respectively, to locate the proper portions on each tape which are to be utilized in the edit operation. For example, in an assemble edit operation, let it be assumed that program material A, which had been recorded previously on the secondary tape, is to be transferred and re-recorded on the primary tape immediately following program B which already is present on the primary tape. Under the control of system controller 18, VTR controllers 14 and 15 supply respective command signals to secondary and primary VTR's 12 and 13 over the illustrated control buses such that these VTR's scan the secondary and primary tapes in order to locate programs A and B. As these tapes are transported, either in their forward or rewind directions, the SMPTE time codes which had been recorded thereon are reproduced and supplied via the respective time code leads to time code readers 16 and 17. The information included in these reproduced SMPTE time codes is supplied from the time code readers to system controller 18. In this manner, the system controller determines when programs A and B are reached. At that time, VTR controllers 14 and 15 may transmit STOP commands to secondary and primary VTR's 12 and 13, thereby halting the tape movements therein. Then, system controller 18 may control VTR controller 15 to command primary VTR 13 to continue operation until the end of program B is reached. This, of course, may be ascertained from the SMPTE time codes which are reproduced from the primary tape, read by time code reader 17 and interpreted by the system controller. When the secondary and primary tapes are positioned at rest at the beginning of program A and B and the end of program B, respectively, system controller 18 controls VTR controllers 14 and 15 to transmit REWIND commands to secondary and primary VTR's 12 and 13, respectively, so as to rewind the secondary and primary tapes by a predetermined amount. Then, system controller 18 may control the respective VTR controllers to transmit FORWARD or PLAYBACK commands to the respective secondary and primary VTR's, whereby the secondary and primary tapes are advanced at their normal, synchronized speeds. When system controller 18 then determines that the secondary tape is at the beginning of program A and the primary tape is at the end of program B, as by interpreting the SMPTE time code data which is read from the respective tapes by time code readers 16 and 17, system controller 18 controls VTR controller 14 to transmit a PLAYBACK command to secondary VTR 12, and also controls VTR controller 15 to transmit a RECORD command to primary VTR 13. At that time, program A is transferred from playback VTR 12 to be re-recorded on record VTR 13. Concurrent with this recording of program A, time code generator 11 supplies the aforementioned signals to time code processing circuit 19, whereby SMPTE time code characters are recorded in bi-phase format on the primary tape.

Figure 2:
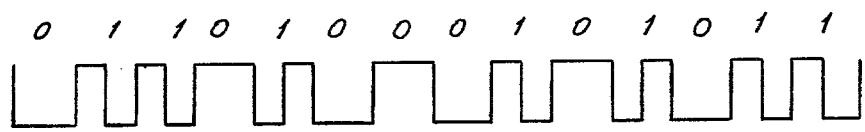
FIG. 2 is a waveform diagram of a bi-phase coded signal of the type which can be included in an SMPTE time code character.

Referring to FIG. 2, there is illustrated a portion of an SMPTE time code character in the bi-phase format which is recorded on, for example, the primary tape. As illustrated, each binary bit, either binary "1" or binary "0", commences with a level transition at the beginning of its bit period. A binary "0" does not include any further level transition during its bit period; but the binary "1" includes another level transition at about the central portion of the bit period. Hence, the repetition rate for a binary "1" is twice the repetition rate for a binary "0", and this faster repetition rate corresponds to the maximum repetition rate of the bi-phase signal. Since a binary "1" includes a level transition at the beginning of its bit period and another level transition during its bit period, the phase of this signal at the end of the bit period is equal to the phase at the beginning of the bit period, i.e., a level transition in the same direction. However, since a binary "0" includes only a single level transition, which is provided at the start of its bit period, the phase at the end of this signal is opposite to the phase at the beginning thereof. Therefore, it is seen that, in a train of bi-phase signals, the presence of an odd number of binary "0" bits results in the phase at the end of this train being opposite to the phase at the beginning thereof. That is, if this train begins with a high-to-low transition, it will end with a low-to-high transition. Similarly, if the train begins with a low-to-high transition, it will end with a high-to-low transition. However, if the train of bi-phase signals includes an even number of binary "0" bits, then the phase relation at the beginning and end of this train will be the same. That is, the direction of the level transition at the beginning of the train will be equal to the direction of the level transition at the end thereof.

The foregoing principle is used by the present invention to make sure that the phase of an SMPTE time code character which is recorded during, for example, an edit operation, is compatible with the phase at the end of a previously recorded SMPTE time code character. More specifically, if all SMPTE time code characters are controlled to have an even number of binary "0" bits, then the phase at the beginning of each character will be identical to the phase at the end thereof. Thus, regardless of the contents of the character, that is, regardless of the number of binary "1" and "0" bits included therein, the phase at the end of each character will be compatible with the phase at the beginning of the next following character. This means that if each time code character begins with a negative transition, it also will end with a negative transition, regardless of the particular contents of that character. Hence, in an assembly edit operation, if all previously recorded time code characters contain an even number of binary "0", bits, then a new time code character which also contains an even number of binary "0" bits will be compatible with the last previously recorded character regardless of the specific contents of that recorded character. This avoids the need of interpolating the next-to-last recorded character so as to ascertain the contents of the last recorded character and thereby adjust the new character to be compatible therewith. By nature of the fact that all characters, both previously recorded and new characters, contain an even number of binary "0" bits, the phase at the beginning of the new character will be compatible with the phase at the end of the previously recorded character.

The standardized SMPTE time code character is comprised of eighty bits. The first four bits (bits 0–3) represent the units of the frame number in BCD code. Bits 4–7 are the first binary group which can be used by the user to represent user-related data. Bits 8 and 9 represent the tens of the frame member in BCD code. Bit 10 is a so-called "drop frame" bit which is used in error correction when an NTSC color video signal is recorded. Bit 11 is fixed as a binary "0" bit. Bits 12–15 constitute the second binary group which may be used by the user to represent user-related data. Bits 16–19 represent the units of seconds in the time data of the SMPTE code. Bits 20–23 constitute the third binary group. Bits 24–26 represent the tens in the seconds of the time data which is to be recorded. Bit 27 is an unassigned address bit and, unless utilized by the user, is a binary "0". Bits 28–31 constitute the fourth binary group. Bits 32–35 represent the units of minutes of the time data. Bits 36–39 constitute the fifth binary group. Bits 40–42 represent the tens of the minutes in the time data. Bit 43 is an unassigned address bit and, unless utilized by the user, is a binary "0". Bits 44–47 constitute the sixth binary group. Bits 48–51 represent the units of the hours of the time data. Bits 52–55 constitute the seventh binary group. Bits 56 and 57 represent the tens of the hours of the time data. Bit 58 is an unassigned address bit and, unless utilized by the user, is a binary "0". Bit 59 is fixed as a binary "0". Bits 60–63 constitute the eighth binary group. Bits 64–79 constitute a 16-bit synchronizing word. This synchronizing word is represented as 0011111111111101. In this particular format, the synchronizing word can be readily detected because of the twelve successive binary "1" bits. Furthermore, the particular location of the binary "0" bits therein facilitates detection of this synchronizing word in either the forward or reverse movement of tape.

Since the synchronizing word is fixed as including three binary "0" bits, and since the eighth binary group will be constituted by four binary "0" bits, unless this group is utilized for user-related data, it is appreciated that the last twenty bits in the SMPTE time code character will contain an odd number (i.e., seven) of binary "0" bits. Thus, if the binary "0" bits in the first sixty bits of the character are counted, then it can be readily determined whether this character includes an even or an odd number of binary "0" bits. In accordance with one aspect of the present invention, the SMPTE time code character is made to contain an even number of binary "0" bits such that the phase at the beginning thereof will be equal to the phase at the end of the character. To achieve this, one of the binary "0" bits in the eighth binary group is selectively changed from a binary "0" to a binary "1" in order to insure that the entire SMPTE time code character will contain an even number of binary "0" bits. Thus, if the first sixty bits contain an odd number of "0" bits, then it is known that, since the remaining twenty bits also contain an odd number of binary "0" bits, the entire SMPTE time code character will contain an even number of binary "0" bits. Hence, a binary "1" bit is not substituted for a binary "0" bit included in the eighth binary group. However, if the first sixty bits contain an even number of binary "0" bits, then it is known that, since the remaining twenty bits contain an odd number of binary "0" bits, the entire SMPTE character contains an odd number of binary "0" bits. As a result thereof, a predetermined binary "0" bit included in the eighth binary group is replaced by the binary "1" bit, thereby making the total number of binary "0" bits included in the SMPTE character an even number.

Turning now to the partial block, partial logic diagram illustrated in FIG. 3, the circuit shown therein functions in accordance with the foregoing explanation to insure that each SMPTE time code character which is recorded by, for example, primary VTR 13 (FIG. 1) will contain an even number of binary "0" bits. Hence, by utilizing the circuit shown in FIG. 3, a constant phase relation is maintained between the phases at the beginning and end of each SMPTE character. That is, each SMPTE character begins with and ends with a level transition in the same direction. The illustrated circuitry is comprised of SMPTE time code generator 11 and, as shown in greater detail herein, time code processing circuit 19, both of these elements having been described previously with respect to FIG. 1. SMPTE time code generator 11 includes output terminals 31–36 for supplying, under the control of system controller 18, the following signals:

Output terminal 31 supplies the SMPTE time code, serially-by-bit, in conventional binary "1" and "0" form;

Output terminal 32 supplies a clock pulse signal having a frequency equal to the maximum repetition rate (i.e., the binary "1" rate) of the bi-phase signal;

Output terminal 33 supplies a clock pulse signal having a frequency equal to twice the maximum repetition rate of the bi-phase signal;

Output terminal 34 supplies a binary "1" in time coincidence with a predetermined bit included in the eighth binary group of the SMPTE time code character, for example, a binary "1" in time coincidence with the sixty-third bit of the SMPTE character;

Output terminal 35 supplies the entire SMPTE time code character during the first bit period of that character; and Output terminal 36 supplies a reset pulse at the beginning of each SMPTE character. It may be appreciated that time code generator 11 may include appropriate oscillating and frequency-dividing circuits for generating the aforementioned clock pulses, and also may include a counting circuit for generating the aforementioned reset pulse. The SMPTE time code supplied at output terminal 31 may be generated by any typical time code generating circuitry normally used in the VTR recording art. Suitable counting and gating circuitry may be used to produce the binary "1" bit at output terminal 34. The high frequency SMPTE time code, which is supplied at output terminal 35, may be produced by reading out the SMPTE time code, which normally is supplied at output terminal 31, at a correspondingly high clock rate, for example, at a rate which is eighty times the rate at which the time code is supplied at output terminal 31.

Time code processing circuit 19 is comprised of AND gates 22 and 26, an OR gate 28, a triggerable flip-flop circuit 30, a "0" detecting circuit 23, a counter 25 and an even detecting circuit 27. AND gate 22 is coupled to output terminal 31 for receiving the serial-by-bit SMPTE time code. Another input of AND gate 22 is coupled to output terminal 34 via an inverter 24 so as to receive an inverted version of the binary "1" bit which is produced in time coincidence with the sixty-third bit included in the eighth binary group of the SMPTE time code.

AND gate 26 includes an input connected directly to output terminal 34 for receiving the binary "1" bit which is produced in time coincidence with the sixty-third bit included in the eighth binary group of the SMPTE time code. Another input of AND gate 26 is connected to even detecting circuit 27 for receiving an enabling signal therefrom, as will be described below. The outputs of AND gates 22 and 26 are connected to respective inputs of OR gate 28. This OR gate also includes another input connected to output terminal 32 to receive the clock signal whose frequency is equal to the maximum repetition rate of the bi-phase signal.

In one embodiment thereof, triggerable flip-flop circuit 30 comprises a J-K flip-flop circuit having J and K inputs connected in common to the output of OR gate 28. As is conventional, this J-K flip-flop circuit also includes a clock input connected to output terminal 33 to receive the clock signal whose frequency is equal to twice the maximum repetition rate of the bi-phase signal. The circle shown at the clock input indicates that the clock signal is inverted, and this inverted clock signal functions to trigger the flip-flop circuit from one state thereof to another. J-K flip-flop circuit 30 also includes a reset input connected directly to output terminal 36 to receive the reset pulse which is generated at the beginning of each SMPTE time code character by SMPTE time code generator 11. The output of J-K flip-flop circuit 30 is connected to an output terminal 20 to supply the bi-phase SMPTE time code signal thereto, as will be described.

"0" detecting circuit 23 is connected to output terminal 35 to receive the high frequency version of the SMPTE time code character which is generated during the first bit period of the SMPTE time code. This "0" detecting circuit is adapted to detect each binary "0" bit included in the SMPTE time code character and to generate a pulse in response to each detected binary "0". The output of "0" detecting circuit 23 is connected to counter 25. This counter may comprise a conventional binary counter which is responsive to each pulse supplied thereto by the "0" detecting circuit. The output of counter 25 is coupled to even detecting circuit 27, the latter functioning to determine whether the count of counter 25 is an odd or an even number. As an example thereof, if the least significant bit of counter 25 is a binary "1", then an odd number of binary "0" bits will have been supplied to "0" detecting circuit 23 and counted by counter 25. Even detecting circuit 27 may function to determine the state of this least significant bit in the count of counter 25. In the event that this least significant bit is a binary "1", representing an odd number of binary "0" bits, even detecting circuit 27 supplies an enable signal, such as a binary "1", to AND gate 26. Conversely, if even detecting circuit 27 detects a binary "0" as the least significant bit in the count of counter 25, representing an even number of binary "0" bits, the even detecting circuit supplies an inhibit signal, such as a binary "0", to AND gate 26. Of course, and as may be appreciated, even detecting circuit 27 may comprise other gating circuitry which functions to distinguish between an odd number and an even number in the count of counter 25.

The manner in which the circuit illustrated in FIG. 3 operates to generate an SMPTE time code character whose phase at the beginning of such character is equal to the phase at the end thereof now will be described with reference to the waveform diagrams shown in FIGS. 4A–4G. It should be appreciated that J-K flip-flop circuit 30 is conventional in that, if the J and K inputs thereof are connected in common and supplied with a binary "1", the state of this flip-flop circuit will change if a negative transition is supplied to its clock input. That this flip-flop circuit is triggered in response to a negative clock transition is represented by the circle, or inverting input, at its clock input. If a binary "0" is supplied in common to the J and K inputs of flip-flop circuit 30, the state of this flip-flop circuit will not change even when a negative transition is supplied to its clock input.

Let it be assumed that output terminal 33 supplies the clock pulse signal shown in FIG. 4A having a frequency equal to twice the maximum repetition rate of the bi-phase SMPTE bits which is generated by time code processing circuit 19. This clock pulse signal A is shown in FIG. 4A. Let it be further assumed that the clock pulse signal which is supplied to output terminal 32, and which has a frequency equal to the maximum repetition rate of the bi-phase SMPTE code bits is of the type shown in FIG. 4B. The waveform diagrams shown in FIGS. 4A–4G are referenced to the bit periods of the eighty bits (0–79) which constitute the standardized SMPTE time code. It is further assumed that bit numbers (N−1), (N), (N+1) and (N+2) constitute the eighth binary group, wherein bit number N is the sixty-first bit. Of course, these bits may, if desired, constitute any binary group which is included in the standardized SMPTE time code. FIG. 4C represents the binary "1" bit which is supplied to input terminal 34 by SMPTE time code generator 11 in time coincidence with the Nth bit, for example, the sixty-first bit included in the eighth binary group. It will be recognized that this binary "1" bit (FIG. 4C) can be produced in time coincidence with any bit included in the eighth binary group or, for that matter, with any bit included in any desired binary group of the SMPTE character.

The reset pulse shown in FIG. 4D is supplied from output terminal 36 to the reset input of J-K flip-flop circuit 30. This reset pulse serves to reset the flip-flop circuit, if necessary. That is, this reset pulse serves to change over the state of the flip-flop circuit from a higher binary "1" level to a lower binary "0" level at the beginning of each time code character. It will be explained that, in accordance with this invention, such a resetting of the flip-flop circuit by the reset pulse shown in FIG. 4D is, in most instances, unnecessary. FIG. 4E represents the SMPTE time code in binary "1" and "0" format which is supplied to output terminal 31. It is this time code which is converted to the bi-phase format by J-K flip-flop circuit 30 in accordance with the following operation.

Until bit N is generated, it is appreciated that inverter 24 is supplied with a binary "0" (FIG. 4C) so as to apply a binary "1" enabling signal to AND gate 22. Thus, until bit number N is generated, AND gate 22 is enabled to transmit the SMPTE binary time code, shown in FIG. 4E, through OR gate 28 to J-K flip-flop circuit 30. Also, the clock pulse signal shown in FIG. 4B is supplied to the J-K flip-flop circuit through OR gate 28. At the start of the SMPTE time code, the reset pulse (FIG. 4D) resets J-K flip-flop circuit 30 such that the bi-phase SMPTE time code character generated thereby, and shown in FIG. 4F, commences with a negative transition. At the middle portion of bit number 0, the clock pulse signal shown in FIG. 4A undergoes a negative transition. However, at that time, the clock pulse signal shown in FIG. 4B, as well as the SMPTE bit shown in FIG. 4E both are at the binary "0" level. Hence, J-K flip-flop circuit is not triggered and, therefore, remains at its lower binary "0" state, as shown in FIG. 4F. At the beginning of bit number 1, the SMPTE bit shown in FIG. 4E is a binary "1", such that the negative transition in the clock pulse applied to J-K flip-flop circuit 30 (FIG. 4A) triggers this flip-flop circuit to its higher, binary "1" level, as shown in FIG. 4F. Then, during the middle portion of bit number 1, the SMPTE bit remains at its binary "1" level, such that the negative transition in the clock pulse signal (FIG. 4A) triggers J-K flip-flop circuit 30 from its higher binary "1" level to its lower binary "0" level, as shown in FIG. 4F.

At the start of bit number 2, the SMPTE bit shown in FIG. 4E is a binary "0". However, the clock pulse signal shown in FIG. 4B, and transmitted through OR gate 28, is about to change over from its higher to its lower level. At the instant of the negative transition at the start of bit number 2 in the clock pulse signal shown in FIG. 4A, the clock pulse signal shown in FIG. 4B is at its higher level, whereupon J-K flip-flop circuit 30 is triggered so as to change over its output from the lower binary "0" level to the higher binary "1" level, as shown in FIG. 4F. At the time of occurrence of the negative transition in the clock pulse signal shown in FIG. 4A during the middle portion of bit number 2, both the SMPTE bit and the clock pulse signal shown in FIG. 4B are at their respective binary "0" levels. Hence, this negative transition in the clock pulse signal shown in FIG. 4A does not trigger J-K flip-flop circuit 30. As shown in FIG. 4F, the output of this J-K flip-flop circuit remains at its higher binary "1" level throughout bit period number 2, thus representing a binary "0". At the conclusion of bit number 2, the clock pulse signal shown in FIG. 4B, and supplied through OR gate 28 to the common-connected J and K inputs of flip-flop circuit 30 is about to undergo a negative transition. Thus, at the end of bit period number 2, that is, at the start of bit period number 3, J-K flip-flop circuit 30 is triggered by the negative transition in the clock pulse signal shown in FIG. 4A so as to change its output over from the higher binary "1" level to the lower binary "0" level, as shown in FIG. 4F.

From the foregoing description of the operation of the time code processing circuit shown in FIG. 3, it is appreciated that the output signal produced by J-K flip-flop circuit 30 is changed over at the beginning of each bit period regardless of whether the SMPTE bit is a binary "1" or a binary "0". However, if the SMPTE bit is a binary "1", the output of J-K flip-flop circuit 30 also is changed over during the middle portion of the bit period in response to the negative transition of the clock pulse signal shown in FIG. 4A.

When bit number N is produced, output terminal 34 supplies a binary "1", as shown in FIG. 4C. This bit is inverted by inverter 24 to supply an inhibit binary "0" to AND gate 22. Thus, during bit number N, AND gate 22 is inhibited to prevent the SMPTE bit from being supplied through OR gate 28 to J-K flip-flop circuit 30. At the same time, the binary "1" shown in FIG. 4C is supplied to AND gate 26. If this AND gate is enabled by even detecting circuit 27, then AND gate 26 supplies a binary "1" through OR gate 28 to the J-K flip-flop circuit. Let it be assumed that the high speed SMPTE time code which is supplied by input terminal 35 to "0" detecting circuit 23 during bit period number 0 contains an odd number of "0" bits. This means that an odd number of pulses, each pulse corresponding to each detected binary "0" bit, generated by "0" detecting circuit 23, and shown in FIG. 4G, is supplied to counter 25. Consequently, even detecting circuit 27 produces a binary "1" which is supplied as an enabling signal to AND gate 26.

Now, upon the occurrence of bit number N, the binary "1" supplied by output terminal 34 as shown in FIG. 4C is transmitted through enabled AND gate 26 to OR gate 28, and thence to J-K flip-flop circuit 30. This means that the binary "0", which normally had been present as bit number N in the SMPTE code shown in FIG. 4E is replaced by the binary "1" gated through AND gate 26. J-K flip-flop circuit 30 responds in the normal manner to this binary "1" so as to produce a transition at the beginning of bit period number N, and another transition during the middle portion of this bit period, as shown in FIG. 4F.

At the completion of the binary "1" generated during bit period number N, AND gate 26 is disabled and AND gate 22 once again is enabled to continue to transmit the SMPTE bits shown in FIG. 4E to OR gate 28 to J-K flip-flop circuit 30. Thus, from bit period number (N+1) to bit period number 79, the J-K flip-flop circuit 30 functions in the manner described above to produce the remainder of the bi-phase SMPTE time code shown in FIG. 4F.

It is appreciated that, by substituting a binary "1" for the binary "0" during bit period number N, the number of binary "0" bits included in the SMPTE time code is changed from an odd number to an even number. This means that the phase at the end of the SMPTE character is equal to the phase at the beginning thereof. As shown in FIG. 4F, a negative transition is provided at the beginning and at the end of the illustrated SMPTE time code character. Conversely, if the SMPTE time code contains an even number of binary "0" bits, then the number of binary "0" bits detected by "0" detecting circuit 23 during bit period number 0 is an even number. Hence, the count of counter 25 is incremented by the pulses generated by "0" detecting circuit 23 to an even number. This means that even detecting circuit 27 supplies a binary "0" to AND gate 26, in response to the even count attained by counter 25. As a result thereof, AND gate 26 is inhibited so as to block the binary "1" generated during bit period number N (shown in FIG. 4C) from being supplied to J-K flip-flop circuit 30. In that event, that is, if the SMPTE time code contains an even number of binary "0" bits, no change is made thereto and, therefore, since an even number of bits already is provided in the SMPTE time code character, the bi-phase character generated by flip-flop circuit 30 is provided with a level transition at the beginning thereof which is of the same phase as the level transition at its end.

In the embodiment shown and described herein, it is seen that a normally binary "0" bit which is provided during a binary group of the SMPTE character that is not utilized for data representation is selectively changed over to a binary "1" bit in order to furnish the SMPTE time code with an even number of binary "0" bits. Thus, this selective insertion of the binary "1" bit during bit period number N does not affect the frame address represented by the SMPTE code. Of course, if desired, any unassigned or non-used bit included in the SMPTE character which normally is a binary "0", can be selectively changed over to a binary "1" if this change over is needed to provide an even number of binary "0" bits in the entire character. This selective change over maintains a constant phase relation between the phases at the beginning and end of each SMPTE character, while not affecting the overall data represented by that character.

In the embodiment shown in FIG. 3, counter 25 and even detecting circuit 27 are provided for the purpose of detecting whether the number of binary "0" bits included in the SMPTE time code is an even number or an odd number. In place of counter 25 and even detecting circuit 27, a triggerable flip-flop circuit, such as flip-flop circuit 21 shown in FIG. 5, can be used. It is seen that if flip-flop circuit 21 is reset to, for example, an initial state, and then is set in response to the first pulse produced by "0" detecting circuit 23, and then reset by the next following pulse produced by the "0" detecting circuit, then flip-flop circuit 21 will be set in response to the detection of each odd binary "0", and will be reset in response to the detection of each even binary "0". Thus, since the entire SMPTE time code is generated at the much higher rate during bit period number "0", the state of flip-flop circuit 21 at the beginning period number 1 will represent whether an even or an odd number of binary "0" bits is included in the entire SMPTE time code. More particularly, flip-flop circuit 21 will be in its set state if the SMPTE time code includes an odd number of binary "0" bits, and this flip-flop circuit will be in its reset state when the SMPTE time code includes an even number of binary "0" bits. If the set state of the flip-flop circuit is represented as a binary "1" produced thereby, it is seen that AND gate 26 is enabled so as to insert the binary "1" (FIG. 4C) produced during bit period number N into the SMPTE time code (FIG. 4E) if this time code includes an odd number of binary "0" bits. Thus, the embodiment shown in FIG. 5, when used in place of counter 25 and even detecting circuit 27, nevertheless functions in the same way as the embodiment discussed above.

As a still further alternative embodiment, the combination of "0" detecting circuit 23 and triggerable flip-flop circuit 21 (FIG. 5) can be connected to output terminal 31 so as to detect the binary "0" bits as they occur in the SMPTE time code illustrated in FIG. 4E. If, as assumed hereinabove, bit period number N corresponds to the sixty-first bit, then by the sixtieth bit, flip-flop circuit 21 will be either set or reset, depending upon the number of binary "0" bits which have been included in the first sixty-one bits (0-60) of the SMPTE character. Normally, bits 61-79 contain an even number (six) of binary "0" bits. Thus, if flip-flop circuit 21 is in its set state after bit number 60, that is, at the beginning of bit period number N, thus representing that an odd number of binary "0" bits have been included in the first sixty-one bits of the SMPTE character, it is seen that the entire SMPTE character will include an odd number of binary "0" bits. Hence, the set state of flip-flop circuit 21 enables AND gate 26 to insert a binary "1" bit for the binary "0" bit normally included as bit number N. This changes the total number of binary "0" bits included in the SMPTE code to an even number. Alternatively, if flip-flop circuit 21 is in its reset state at the beginning of bit number N, i.e., at the beginning of bit number 61, then an even number of binary "0" bits will have been included in the first sixty-one (0-60) bits of the SMPTE character. This means that the entire SMPTE character includes an even number of binary "0" bits. Hence, the reset state of flip-flop circuit 21 inhibits AND gate 26 from inserting the binary "1" (FIG. 4C) into bit period number N of the SMPTE time code.

Figure 6:
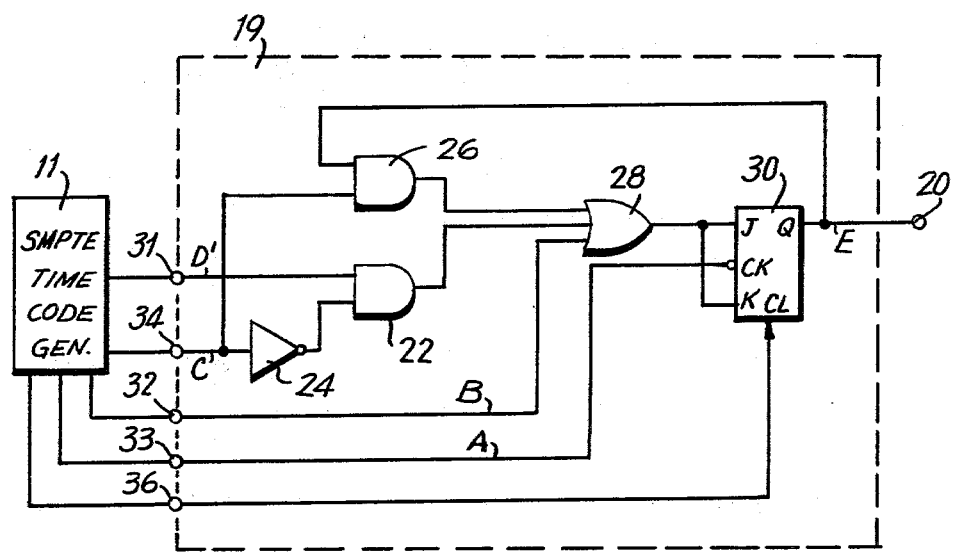
FIG. 6 is a partial block, partial logic diagram of another embodiment of this invention.

Referring now to FIG. 6, there is illustrated yet another embodiment of time code processing circuit 19. The embodiment shown in FIG. 6 is substantially the same as the embodiment discussed hereinabove with reference to FIG. 3 and, as indicated, the same reference numerals have been used to identify the same component parts. The difference between the embodiment shown in FIG. 6 and the previously described embodiment of FIG. 3 is that "0" detecting circuit 23, counter 25 and even detecting circuit 27 are omitted. Accordingly, output terminal 35 likewise is omitted.

The operation of the embodiment shown in FIG. 6 is described with reference to the waveform diagrams illustrated in FIGS. 7A-7F. These waveform diagrams are referenced with respect to bit period numbers 60, 61, . . . 78, 79,0. Furthermore, it is assumed that the eighth binary group is constituted by bit numbers 60, 61, 62 and 63, with bit numbers 64 and 65 constituting the first two binary "0" bits in the synchronizing word. FIG. 7D represents the SMPTE code for bits numbers 60 . . . 79, 0. It is assumed, for the purpose of discussing the embodiment shown in FIG. 6, that bit number 61 included in the eighth binary group is a binary "1" bit, thus representing that this bit can be utilized for the purpose of providing user-related data.

FIG. 7A represents the higher frequency clock pulse signal, and FIG. 7B represents the lower frequency clock pulse signal, these clock pulse signals being similar to the aforedescribed clock pulse signals of FIGS. 4A and 4B, respectively. Also, FIG. 7C represents the binary "1" bit which has been assumed to be generated during each bit period number 63. FIG. 7D represents the last twenty bits of the SMPTE character, and particularly, bits 60-63 which constitute the eighth binary group and bits 64-79 which constitute the synchronizing word. FIG. 7E represents the bi-phase SMPTE code which is generated by flip-flop circuit 30 for bit periods numbers 60 . . . 79. It is assumed that this SMPTE character, as well as every other SMPTE character, begins with a negative transition at the beginning of bit number zero. This means that if bits 0-61 contain an odd number of binary "0" bits, a positive transition will be provided at the Q output of J-K flip-flop circuit 30 at the beginning of bit number 62. In accordance with the usual operation of time code processing circuit 19, a negative transition is provided at the beginning of bit period number 63. Also, from the beginning of bit period number 63 to the end of bit period number 79, an even number of binary "0" bits is provided. Thus, if the entire SMPTE time code character is provided with an even number of binary "0" bits, then the Q output of the J-K flip-flop circuit will be at its higher binary "1" level during bit period number 62 and at its lower binary "0" level during bit period number 63. This is shown in FIG. 7E.

However, if the SMPTE time code character contains an odd number of binary "0" bits, then bit numbers 0-62 will contain an odd number of binary "0" bits. This is because an even number (four) of binary "0" bits is provided in bit periods numbers 63-79. Now, if bit period numbers 0-62 contain an odd number of binary "0" bits, then, since bit period number 0 commences with a negative transition, the Q output of flip-flop circuit 30 during bit period number 62 will be at its lower binary "0" level, as shown in FIG. 7F. At the start of bit period number 63, the Q output of the J-K flip-flop circuit undergoes a positive transition in response to the negative transition of the clock pulse signal shown in FIG. 7A supplied to its clock pulse input. This positive transition results in a higher level binary "1" at the Q output of J-K flip-flop circuit 30, thereby enabling AND gate 26 to transmit the binary "1" bit (FIG. 7C) which is supplied thereto during the sixty-third bit period. Hence, when an odd number of binary "0" bits are contained in the SMPTE time code, AND gate 26 is operative, in response to the state of flip-flop circuit 30, to insert the binary "1" bit (FIG. 7C) in place of the usual binary "0" bit at the sixty-third bit period of the SMPTE time code. This inserted binary "1" bit is transmitted by OR gate 28 to J-K flip-flop circuit 30. Thus, at the middle portion of bit period number 63, the J-K flip-flop circuit is triggered in response to the binary "1" supplied to its J and K inputs, and in response to the negative transition in the clock pulse signal (FIG. 7A) supplied to its clock input. Therefore, and as shown in FIG. 7F, in the event that the SMPTE time code character contains an odd number of binary "0" bits, a predetermined "0" bit, that is, the normally "0" bit at bit number 63, is replaced by a binary "1" bit. This changes the overall number of binary "0" bits in the SMPTE time code character from an odd number to an even number. As a result thereof, the phase at the end of this character, that is, the transition between bits numbers 79 and 0, is a negative transition which, of course, is equal in phase to the negative transition at the beginning of the SMPTE character.

In accordance with this invention, a constant phase relation is maintained between the phases at the beginning and end of each SMPTE time code character. Thus, in the assemble edit operation, since all of the previously recorded SMPTE time codes will have, for example, a negative transition at the beginning and end of each character, and since all of the new SMPTE time codes likewise will have a negative transition at the beginning and end of each character, the new SMPTE time codes will be compatible with the previously recorded SMPTE time codes. If the new codes are to be sequential with the previously recorded codes, it is appreciated that editor apparatus 10, shown in FIG. 1, can be operated such that, when the primary tape is advanced prior to the recording thereon of new program information, the previously recorded SMPTE time codes thereon can be read by time code reader 17 and supplied to system controller 18 such that the system controller "sets up" the correct SMPTE time codes for recording on the edited portion of the primary tape.

While the present invention has been particularly shown and described with reference to certain preferred embodiments, it should be readily apparent to those of ordinary skill in the art that various changes and modifications in form and details can be made without departing from the spirit and scope of the invention. For example, for the purpose of recording SMPTE time codes, it is desired to have the phase at the beginning of each character equal to the phase at the end of that character. However, for the recording of other code signals in bi-phase format, it may be desirable to have the phase at the end of a character opposite to the phase at the beginning of the character. In that event, the overall number of binary "0" bits included in each character should be an odd number. This is attained by enabling AND gate 26 (FIGS. 3 and 6) to replace a binary "0" bit with a binary "1" bit in the event that the total number of "0" bits in the character is an even number. Thus, each character will contain an odd number of binary "0" bits, thus insuring that a constant phase relation is maintained, whereby the phase at the beginning of each character is opposite to the phase at the end of each character.

It is, therefore, intended that the appended claims be interpreted as including the foregoing as well as various other changes and modifications.

What is claimed is:

1. Apparatus for generating bi-phase coded characters formed of a predetermined number of bi-phase signals representing binary bits "1" and "0" having a constant relation between the phase at the beginning and end of each coded character regardless of the number of "1"s and "0"s included in said coded character, comprising: a source of binary bits for supplying trains of serial bits corresponding to said coded characters; means for supplying a binary bit of predetermined sense in time coincidence with a selected one of the bits in each coded character; bi-phase signal generating means responsive to each of said binary bits supplied thereto for generating a respective bi-phase signal; and means for selectively inserting said binary bit of predetermined sense into the train of binary bits supplied to said bi-phase signal generating means for maintaining said constant relation between the phases at said beginning and end of the bi-phase coded character generated by said bi-phase signal generating means.

2. The apparatus of claim 1 wherein each of said bi-phase signals commences with a level transition in either the positive or negative direction; and wherein said constant relation is a level transition in the same direction at the beginning and end of each bi-phase coded character.

3. The apparatus of claim 2 wherein the bi-phase signal representing one type of binary bit includes a level transition during the bit period thereof and the bi-phase signal representing the other type of binary bit does not include a level transition during the bit period thereof; and wherein said means for selectively inserting said binary bit of predetermined sense is operative to provide said bi-phase coded signal with an even number of said other type of binary bits.

4. The apparatus of claim 3 wherein said binary bit of predetermined sense is a binary "1" bit; and wherein said means for selectively inserting said binary bit of predetermined sense comprises "0" detecting means for detecting each binary "0" bit in a coded character, means for determining whether said coded character includes an even number of "0" bits; and means for replacing a predetermined "0" bit in said coded character with said binary "1" bit if said coded character includes an odd number of "0" bits.

5. The apparatus of claim 1 wherein said bi-phase signal generating means comprises a source of clock pulses having a frequency equal to at least the maximum rate of change of said bi-phase signals; and triggerable bi-state means for receiving said trains of binary bits, including the selectively inserted binary bit of predetermined sense, and responsive to each clock pulse for changing the state thereof at the beginning of each binary bit period and also for changing the state thereof during a binary bit period if a binary "1" bit is received thereby.

6. The apparatus of claim 5 wherein said clock pulses have a frequency equal to twice the maximum rate of change of said bi-phase signals; said triggerable bi-state means comprises J-K flip-flop means having a trigger input connected to receive said clock pulses and J and K inputs connected in common to receive said trains of binary bits; and further comprising a source of changeover pulses having a frequency equal to said maximum rate of change of said bi-phase signals, and gate means for supplying binary "1" bits in said trains of binary bits to said J and K inputs and for supplying said changeover pulses to said J and K inputs in place of binary "0" bits in said train of binary bits.

7. The apparatus of claim 6 wherein said means for selectively inserting said binary bit of predetermined sense comprises bit sense detecting means operative to detect whether each coded character contains a selected even or odd number of binary bits of one sense; and means for applying said supplied binary bit of predetermined sense to said gate means in accordance with the operation of said bit sense detecting means.

8. The apparatus of claim 7 wherein said coded characters are SMPTE time codes including at least one binary group of bi-phase signals, each binary "1" bit included in the SMPTE time code being represented by a level transition at the beginning of the bit period and a level transition during said bit period and each binary "0" bit included in the SMPTE time code being represented by a level transition at the beginning of the bit period only.

9. The apparatus of claim 8 wherein said binary bit of predetermined sense is supplied in time coincidence with a selected bit in said one binary group; and said bit sense detecting means is operative to detect an even number of binary "0" bits in each coded character.

10. The apparatus of claim 9 wherein said bit sense detecting means comprises means for supplying a representation of an entire SMPTE time code character during the first bit period thereof; "0" counting means for counting the number of binary "0" bits included in said representation; and means for producing an insert signal when the count of said "0" counting means is odd.

11. The apparatus of claim 9 wherein said bit sense detecting means comprises means for detecting each binary "0" bit included in the SMPTE time code; and flip-flop means for changing state in response to each detected binary "0" bit, said flip-flop means producing an insert signal when in one state thereof.

12. The apparatus of claim 10 or 11 wherein said means for applying said supplied binary bit of predetermined sense to said gate means comprises an insert gate responsive to said insert signal for gating said supplied binary bit to said gate means.

13. The apparatus of claim 9 wherein said means for applying said supplied binary bit of predetermined sense to said gate means comprises an insert gate responsive to the state of said J-K flip-flop means for gating said supplied binary bit to said gate means.

14. The apparatus of claim 9 wherein said gate means includes inhibit means for inhibiting the binary bits of the SMPTE time code from being supplied to said gate means during the occurrence of said supplied binary bit of predetermined sense.

15. The apparatus of claim 14 wherein said binary bit of predetermined sense is a binary "1" bit; said selected bit in said one binary group is a binary "0" bit; and said means for applying the supplied binary "1" bit to the gate means is operative if said bit sense detecting means detects an odd number of binary "0" bits in an SMPTE time code character, whereby said binary "0" bit in said one binary group is replaced by the supplied binary "1" bit so as to change the number of binary "0" bits in said SMPTE time code character to an even number.

16. Apparatus for generating bi-phase coded characters formed of a predetermined number of bi-phase signals representing bits "1" and "0" having a constant relation between the phase at the beginning and end of each coded character regardless of the number of "1"s and "0"s included in said character, comprising: a source of binary bits for supplying trains of serial bits corresponding to said coded characters; bi-phase signal generating means responsive to each of said binary bits supplied thereto for generating a respective bi-phase signal; means for determining if the phase relation at the beginning and end of the bi-phase coded character generated by said bi-phase signal generating means in response to said supplied binary bits is other than said constant relation; and replacement means responsive to said means for determining for selectively replacing a predetermined binary bit supplied by said source to said bi-phase signal generating means with a binary bit of opposite sense so as to maintain said constant phase relation.

* * * * *